Figure 1:
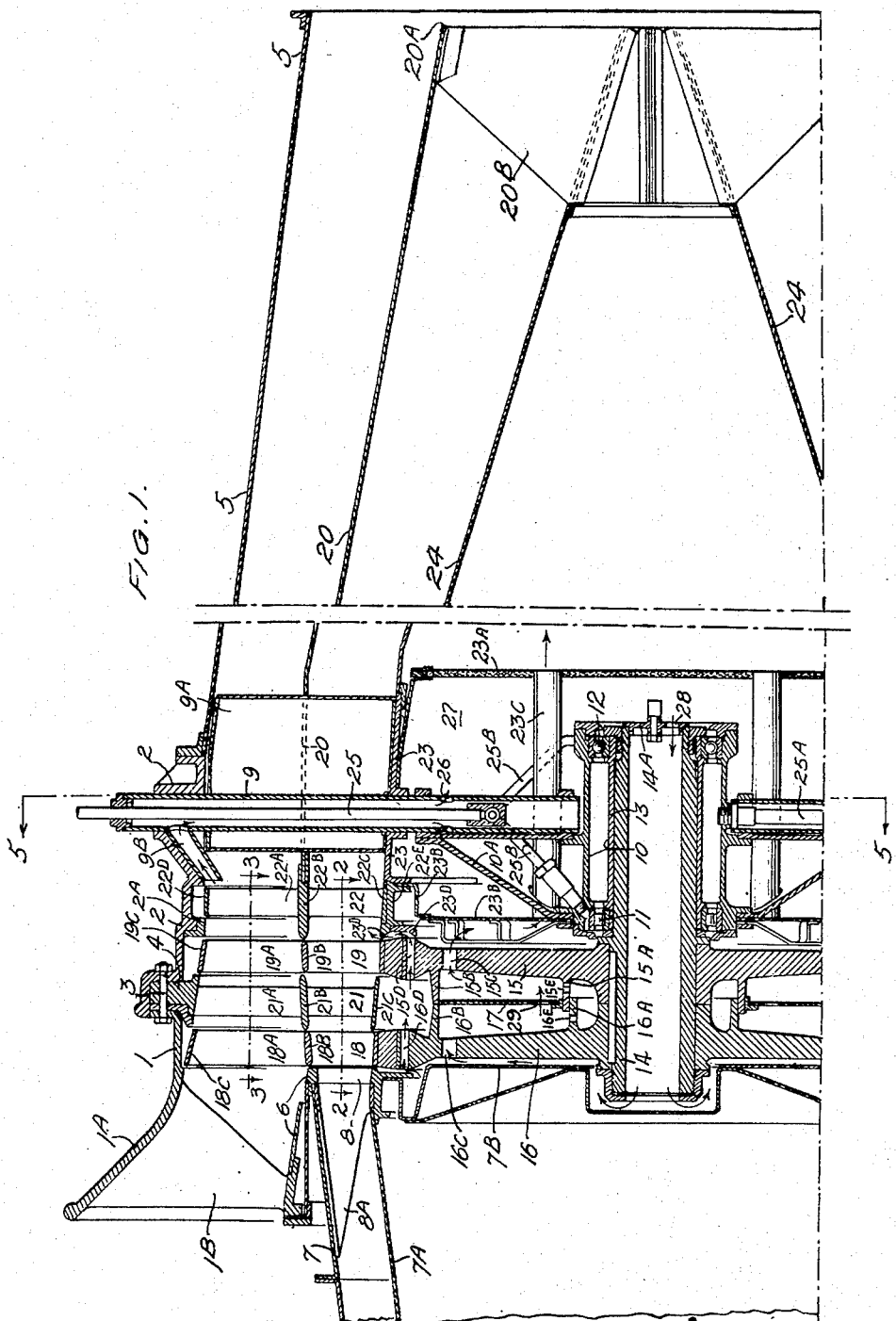

Patented Oct. 26, 1954

2,692,724

UNITED STATES PATENT OFFICE 2,692,724

TURBINE ROTOR MOUNTING

Roderick Cristall McLeod, Cropston, England, assignor to Power Jets (Research & Development) Limited, London, England Application November 7, 1945, Serial No. 627,148
In Great Britain July 2, 1942

Section 1, Public Law 690, August 8, 1946
Patent expires July 2, 1962

5 Claims. (Cl. 230—116)

This invention relates to jet propulsion apparatus for developing propulsive thrust by the reaction of a flow of energised fluid, such as those previously proposed systems for aircraft in which a jet of gas is expelled from a propelling nozzle, the gas having been energised by the imparting thereto of velocity and maybe pressure and heat. Such systems have been proposed previously, using apparatus, for example, as described in British Patent No. 456,980 or United States Patent No. 2,168,726.

The present further invention involves the same basic idea as that described in United States Patent 2,455,458, i. e. that of obtaining greater thrust by increasing the effective total momentum of fluid discharged in unit time. By suitable design it may be found possible to provide for substantially greater thrust at low altitude and forward speed with a somewhat lesser increase at great altitutde and higher speed, or the thrust in the second case may be increased at the expense of the first case. A further object is to increase the rate of mass flow of propellant fluid through the system in order to reduce losses inseparable from ducting and emission of fluid at high velocity, and a related advantage is to increase propulsive efficiency in the system at a given speed by maintaining a given total momentum in unit time, while reducing the velocity in the propulsive jet. The present invention has the further object of affording a practicable form of thrust augmentor for association with a heat engine of the kind above mentioned.

Subsidiary objects include the provision of adequate cooling, simple bearing and lubrication features and relative ease and simplicity of assembly and installation.

The underlying idea of the invention as described in said U. S. Patent No. 2,455,458 resides in the provision of a thrust augmentor comprising a turbine means driven by the main propulsive stream or flow of energised gases which is in the form of a confined or ducted stream and compressor means driven by said turbine means and arranged to be operative in a confined or ducted stream of air, the arrangement being such that the gases leaving the turbine and air leaving the compressor means constitute as a whole a propulsive stream or jet.

According to the invention a thrust augmentor of the kind stated comprises a single rotor element having two or more axially spaced rows of blading each row comprising inner axial flow turbine blades and outer axial flow compressor blades, stator blading being provided between such rows for both turbine and compressor. Preferably the rotor element comprises a pair of separable discs or wheels each carrying a row of blading formed as inner axial flow turbine blading and outer axial flow compressor blading, the latter being integral radial extensions of the former, the discs being mounted for rotation together on common bearing means; the stator blading is located in axial spacing between the rotating rows and consists of complementary turbine and compressor blading supported peripherally. The invention also comprises supporting means for bearing of the rotor element adapted to support the latter coaxially relative to the ducts.

Figure 2:
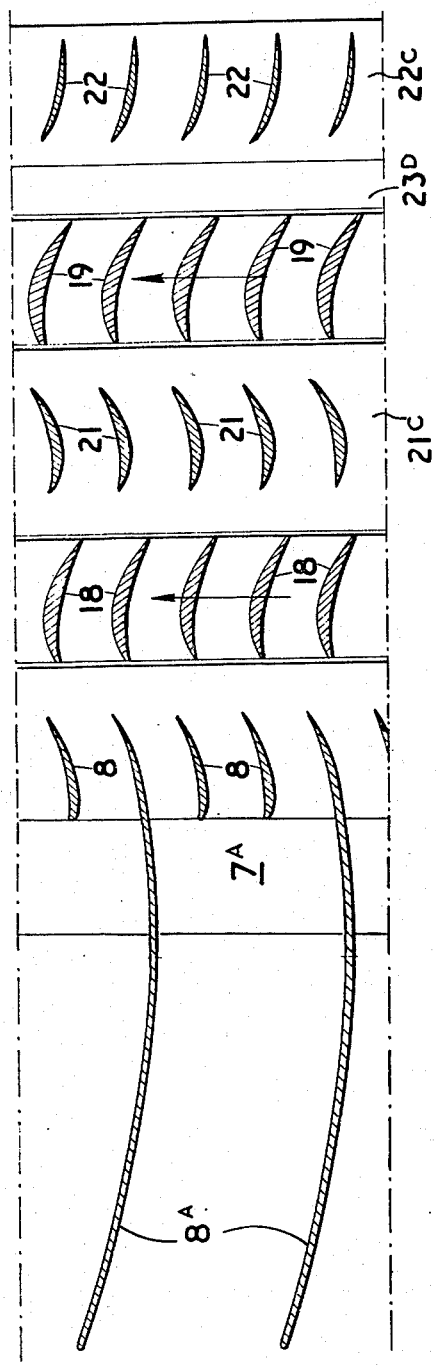
Figure 3:
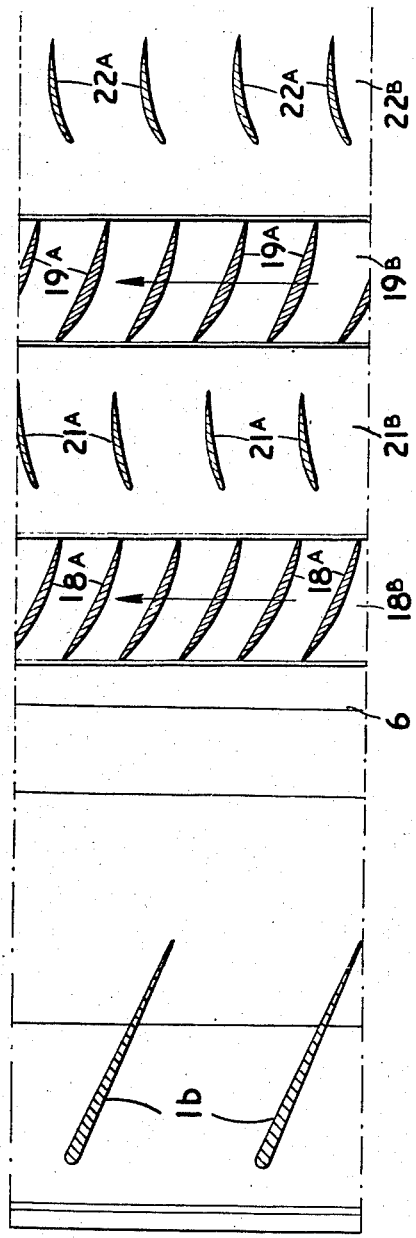
Figure 4:
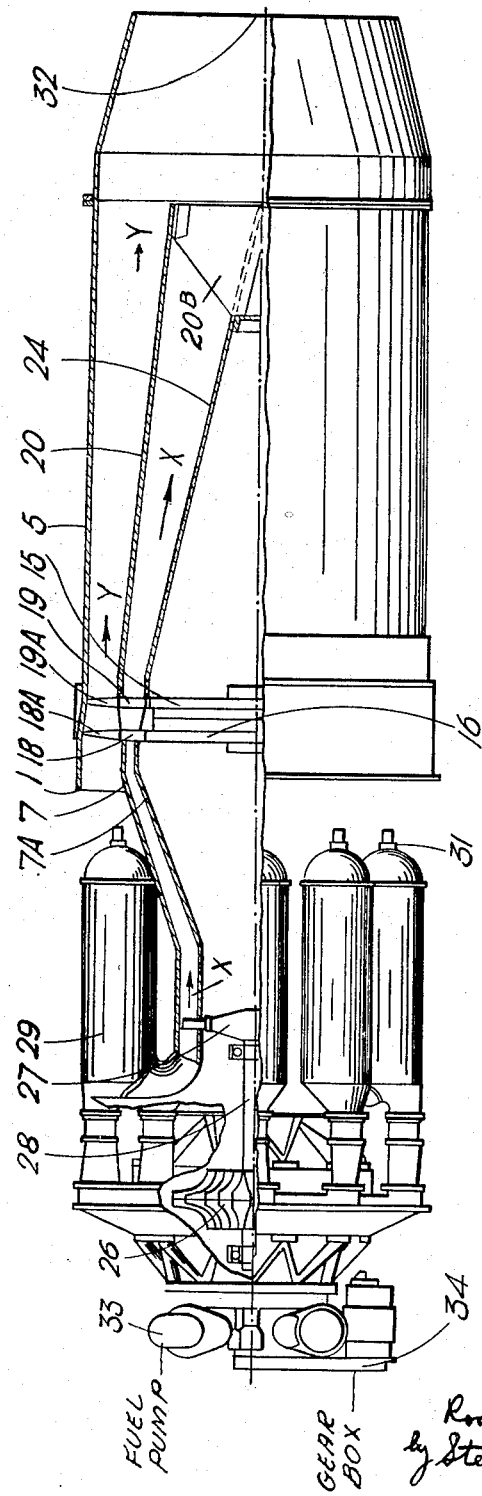
Figure 5:
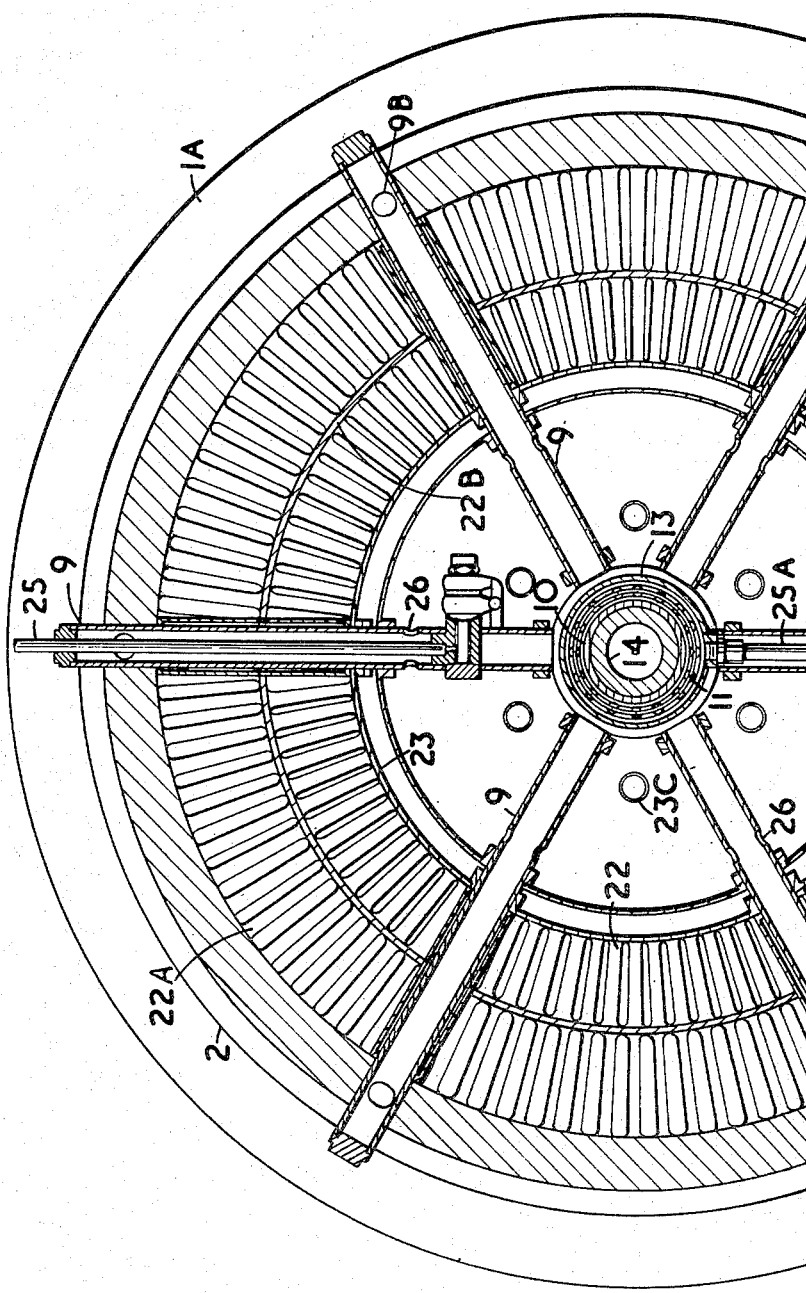

The foregoing and other features of the invention will now be described by way of example with the aid of the accompanying drawings in which:

Fig. 1 is a sectional arrangement drawing;
Figs. 2, 3, are sections on 2—2, 3—3 of Fig. 1.
Fig. 4 is a general diagrammatic view of a propulsive system to which the invention may be applied.
Figure 5 is a view in section taken along the line 5—5 of Figure 1.

Referring first to Fig. 4, a propulsive system applicable for use on aircraft comprises a compressor 26 driven by a gas turbine 27 mounted co-axially on the same shaft 28, the air output from compressor 26 being brought to combustion together with fuel injected by burners 31 in combustion chambers 29. After combustion the hot gases are led from the chambers 29 through the turbine 27, thus driving it together with the compressor 26, then flow in the direction of the arrow X through an annular turbine exhaust pipe 7 and in the space between the wall 20 and conical fairing 24, being finally emitted through an outlet 32 to atmosphere and forming in this way a main propulsive jet stream. The fuel required is supplied from a main tank (not shown) and delivered by means of pump 33 driven by auxiliary gear on the gear box 34.

The propulsive system further comprises an augmentor system 15, 16, shown in detail in Fig. 1 and described hereinunder with reference thereto. Stated briefly, the said augmentor system comprises turbine elements 18, 19, driving compressor elements 18A, 19A which entrain new or secondary air through the duct formed between the outer casing 5 and the pipe wall 20. This air flows in the direction of the arrows Y, is eventually combined with the main stream X at the downstream end of the wall 20 and finally emerges together with said main stream at the outlet 32, thus augmenting the total thrust produced.

Referring now to Fig. 1, an outer casing of substantially cylindrical form is provided with any suitable mounting attachments for installation. It is divided lengthwise into two main parts 1, 2, these being arranged to be inter-attached by bolts 3 or other suitable means and between the parts 1, 2 is held a shroud ring 4 which ties the tips of nozzle blading (to be described later). The upstream end of the outer casing part 1 may be flared or otherwise formed as at 1A to afford a good entry to incoming air or it may be arranged to mate with the aircraft structure or air ducting of the aircraft. At the downstream end of part 2 is attached the final exhaust pipe 5 through which the air and gases comprising the propulsive jet or stream are to flow. At the upstream end the annular wall of the casing part 1 supports an intermediate wall 6 by means of inwardly extending radial webs 1B which are streamlined in section and are inclined to the incoming air to impart a preliminary whirl thereto. At this end the intermediate wall 6 is attached to the downstream end of the wall 7 of the main turbine exhaust pipe which is annular; within this pipe in the same locality is mounted the first row of turbine stator blades 8 the inner ends of which are attached to a core member 7A which forms the inner wall of the exhaust pipe, so that these blades 8 extend across the annular exhaust pipe. The downstream end of the core member 7A is provided with a wall 7B suitably sectioned to afford required stiffness while allowing for expansion effects, which lies adjacent to the face of the upstream disc 16. To further support this end of the core member 7A in addition to these stator blades there are struts or webs 8A which again are inclined to conform with the required direction of gas flow; these are integral with some of the stator blades 8.

Towards the rear end of the part 2 there is provided a series (say six) of inwardly extending radial struts of robust construction. These constitute the main support of the rotating element and its bearings and they may take the form of strong tubular strut members 9 and have external streamlined fairings 9A. They are in any case made hollow since use is made of them for the passage of oil pipes, and such other connections as may be required to the interior of the augmentor. Towards their outer ends these struts 9 or some of them have open-ended pressure heads 9B facing upstream in the air duct. The struts 9 support a bearing housing preferably in the form of a substantially cylindrical element 10 with a conical mounting 10A extending some way out along the struts 9 for stiffness. The cylindrical part of the bearing housing 10 supports the outer races of the bearings. Preferably the forward bearing 11 is a roller bearing and the rear bearing 12 a thrust ball bearing capable of resisting such axial thrust as may be expected. The inner races of these bearings 11, 12, are seated on a tube 13 which is in turn a fit on the main spindle 14 of the augmentor. This spindle is hollow and carries the rotor assembly of the augmentor in a forwardly overhanging manner. The rotor assembly comprises two discs or wheels; the rear disc 15 is a shrink fit on the spindle 14 to which it is also keyed and the front disc 16 may be a clearance fit on the spindle 14 but is likewise keyed. The rear disc 15 has a forwardly extending annular flange 15A formed upon it and the front disc 16 a complementary rearwardly extending flange 16A and these are a force fit, the latter within the former. These flanges are at a relatively small radius. Each disc has a further flange 15B, 16B nearer its rim somewhat similarly arranged, but abutting edge-wise preferably through a thin diaphragm of sheet metal 17 which extends between the two pairs of flanges and forms, as it were, a wall between hollow cavities made re-entrant in each disc. The inner flanges 15A, 16A are perforated radially at 15E, 16E and the discs are perforated axially at a slightly less radius than their outer flanges at 15C, 16C coolant air coming from the compressor pressure heads 9B, passing inwardly through the supporting struts 9 and via apertures 26 in said struts, chamber 27, and aperture 28 through the hollow main spindle 14, ultimately flows outwards along the front face of the forward disc 16 (between it and wall 7B) through the perforations 16C and then through aperture 29 in diaphragm 17 and perforations 15C, 15E, and 16E so that both sides of each disc are washed by this air flow. The whole of the air so supplied for cooling is ultimately collected and allowed to join the propulsive stream behind the augmentor at a point where the pressure distribution is appropriate.

Each disc 15, 16 carries a row of blading; the inner part of these blades constitutes turbine blading 18, 19, and the outer part compressor blading, 18A, 19A. The blades are attached to the discs by serrated or bulb roots, by welding, or any other suitable manner. Where the section changes from turbine to compressor blading each blade presents shoulders or platforms 18B, 19B, extending axially and substantially in the plane of rotation, and of such overall length that collectively the platforms of each row form a band which is virtually continuous. At the tips of the rotor blading, a band is formed by platforms 18C, 19C and these bands run in recesses formed for the purpose, so that they lie operatively in flush continuity with the adjacent surfaces. In cross-sectional shape the platforms 18B, 19B are such as to ensure as uninterrupted a fluid flow as possible, and the bands constituted by these platforms of the rotating blades are arranged to lie in continuity with corresponding banding provided in the stator blading, the banding as a whole forming in effect a wall which is a continuation of the wall 6 of the air entry. The duct boundary so constituted is continued downstream as far as may be desired as a pipe wall 20 and to a region where the velocities of the gas and air are equal in design conditions of operation, where the wall preferably terminates in a trailing edge 20A. The downstream extension of the wall 20 is supported mainly by the struts 9 previously referred to or their streamlined fairings, and also by webs 20B between itself and the fairing 24.

The stator blading is arranged as follows. The first stage turbine stator comprises the blades 8 as stated. Between the first and second stage rotors is a stator row consisting of blades with inner (turbine) blades 21 and outer (compressor) blades 21A with intervening banding 21B, inner banding 21C and outer shroud 4. A guide-vane stator downstream from the second rotor consists of inner (turbine) blades 22 with outer (compressor) blades 22A, intervening banding 22B, inner banding 22C, and outer shroud or band 22D which is supported in the part 2. In each case the stator blade assembly may be fabricated as a continuous annulus or segmentally, and the support and location while being positive allows for expansion. The stator banding may be formed by adjacent platforms as in the rotor blading.

The wall—as it is in effect—formed by 6, 18B, 21B, 19B, 22B is made as gastight as the practical requirements of running clearance and like factors will permit, due allowance being made for the relative expansion of the hot parts and for the method of mounting. The drawing illustrates a cold condition hence the slightly staggered relationship of surfaces evidently destined to run virtually flush and continuous. The inner banding 21C is supported only by its blading, but 22C is inset in a channelled ring 22E which is mounted indirectly on the struts 9, rigidly with an assembly carried, along with the bearing housing 10, as an internal coaxial assembly forming in effect part of the core of the ducting. This assembly comprises a frustro-conical shell 23 (supporting 22E) forming the upstream end of a stationary fairing 24 and from which the fairings 9A in effect extend radially. The shell 23 is closed rearwardly by an internal wall 23A which is preferably arranged as a heat insulator. Forwardly it has a wall 23B shaped to conform with the shape and arrangement of adjacent parts, and includes air-cavities to minimise heat transfer. Passing through the two walls 23A, 23B, are air pipes 23C to equalize pressures and help the support of the walls. The ring 22E supports and presents a pair of spaced sealing edges 23D just clear of the root region of the disc 15. It will be appreciated that only in regions where strength and rigidity are required are the core or inner parts, or the exhaust piping and walls made of anything but relatively light sheet metal. The structures involved are designed to take account of thermal expansions and they are made sufficiently stiff or given sufficient support to resist pressure differences in various regions.

The struts 9 are arranged to be free for radial sliding where they pass through the part 2. Providing there are three or more of them they constitute a mechanically complete support and location for the whole of the inner assembly of the device, whilst allowing for thermal expansions. The fairings 9A have appropriate end clearance for expansion. One (or more) of the struts is used as a conduit for oil piping; an oil supply pipe is shown at 25, in a strut 9, and an oil scavenge pipe at 25A. The supply pipe 25 is in effect branched by pipes 25B to the two bearings, whilst 25A receives oil from within the bearing housing 10.

The majority of the coolant air, which passes through the holes 15C, flows behind a baffle carrying the sealing edges 23D arranged between the wall 23B and disc 15 and thence through the pipes 23C to the interior of the fairing 24, emerging therefrom at the rearward extremity. The remainder of the air passes through supplementary holes 16D, 15D, in the discs and into the annulus between the seals 23D whence it escapes through the upper seal into the turbine gas stream. The flanges 15B, 16B segregate the space between the discs and the band 21C, for the confinement of this part of the air flow. To clarify the air flow, arrows in the drawings are shown as indications of direction.

The downstream end of the shaft 14 is "capped" by a spider or perforated cap 14A which supports a driving element for a tachometer should this be required.

The inner assembly as a whole, that is to say, that which is bounded by the surfaces of 7A, the rim of rotor 16 (or blade root shoulders), 21C, rim of 15, 22C, 23, 24, may be regarded as a substantially streamlined core coaxially placed in the exhaust-gas duct within 7, 18B, 21B, 19B, 22B, 20 which is again within the outer wall of the air duct viz: 1A, 18C, 4, 19C, a ring 2A attached within 2, 22D, and 5.

The exhaust gas and air streams are thus segregated in their respective annular ducts, to the downstream extremity, whereafter they may emerge to atmosphere or be confined in a single jet pipe.

Figs. 2 and 3 show the lie of the blading at the sections 2—2, 3—3 of Fig. 1, respectively, like reference numerals being used.

I claim:

1. A thrust augmentor of the class defined comprising a single rotor element having a pair of separable discs each carrying a row of blading formed as inner axial flow turbine blading and outer axial flow compressor blading, the latter being integral radial extensions of the former, the said discs being mounted for rotation together on common bearing means; stator blading located in axial spacing between the said rows and consisting of complementary turbine and compressor blading supported peripherally; an inner annular duct corresponding to the said turbine blading for the turbine operating gases, and an outer annular duct corresponding to the compressor blading for air and coaxially surrounding the inner duct; and supporting means comprising at least three struts extending radially across both ducts from the outer wall of the outer duct to the bearing of the rotor element, said struts being spaced angularly and mounted free for radial sliding to support the latter coaxially relatively to the said ducts and allow for thermal expansion.

2. An augmentor according to claim 1 in which the said supporting means lies downstream of the blading.

3. A turbo machine comprising a rotor having thereon compressor and turbine blades, a bearing for said rotor, concentric inner and outer annular ducts accommodating respectively said compressor and turbine blades, supporting means comprising at least three struts extending radially across both ducts from the outer wall of the outer duct to the bearing of the rotor element, said struts being spaced angularly and mounted free for radial sliding to support said bearing coaxially relative to the ducts and to allow for thermal expansion, said struts having a passage system therethrough, said system having an air intake communicating with the outer annular air duct at a position downstream from the compressor blading and extending inwards across the inner annular gas duct for the cooling of at least a part of the bearing and rotor element structure.

4. A turbo machine as claimed in claim 3 comprising means for leading coolant air from said passage system into the interior space formed by the inner wall of the inner duct, the inner wall of the inner duct defining an outlet for the air leading into the inner annular gas duct.

5. A thrust augmentor comprising a single rotor element having a pair of separable discs each carrying a row of blading formed as inner axial flow turbine blading and outer axial flow compressor blading, the latter being integral radial extensions of the former, the said discs being mounted for rotation together on common bearing means; stator blading located in axial spacing between the said rows and consisting of complementary turbine and compressor blading supported peripherally; an inner annular duct corresponding to the said turbine blading for the turbine opertaing gases, and an outer annular duct corresponding to the compressor blading for air and coaxially surrounding the inner duct; and means for supporting said bearing means from the outer duct.

References Cited in the file of this patent

UNITED STATES PATENTS

| Number | Name | Date |
|---|---|---|
| 2,168,726 | Whittle | Aug. 8, 1939 |
| 2,372,467 | Alford | Mar. 27, 1945 |
| 2,396,911 | Anxionnaz et al. | Mar. 19, 1946 |
| 2,405,919 | Whittle | Aug. 13, 1946 |
| 2,409,177 | Allen et al. | Oct. 15, 1946 |
| 2,411,124 | Baumann | Nov. 12, 1946 |
| 2,417,845 | Soderberg | Mar. 25, 1947 |
| 2,426,098 | Heppner | Aug. 19, 1947 |
| 2,453,547 | Soderberg et al. | Nov. 9, 1948 |

FOREIGN PATENTS

| Number | Country | Date |
|---|---|---|
| 14,641B | Great Britain | July 15, 1905 |
| 76,744 | Austria | June 10, 1919 |
| 215,484 | Switzerland | Oct. 1, 1941 |